May 13, 1958     C. SPEISMAN     2,834,085
TWO BLOCK SYSTEM CLAMPING DEVICE
Filed Jan. 18, 1957
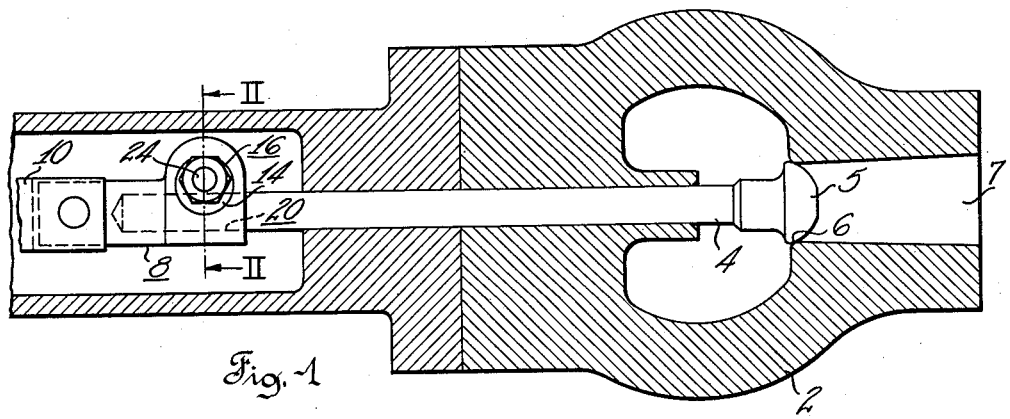
Fig. 1
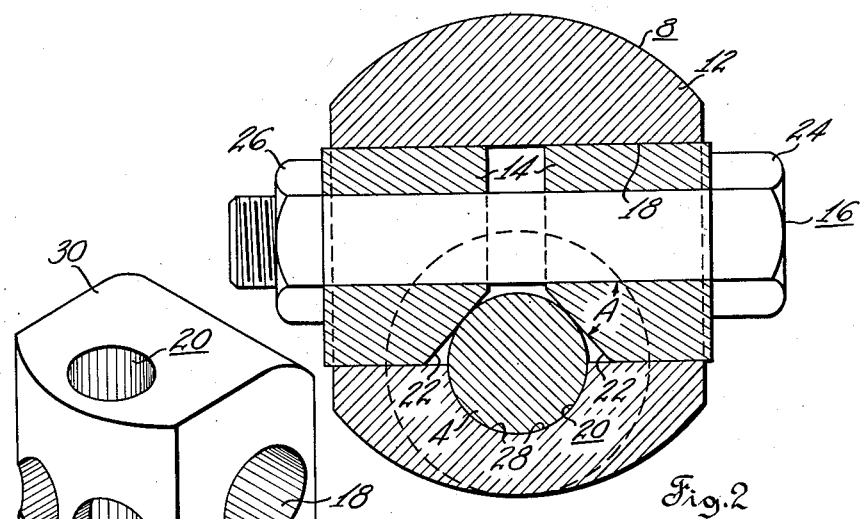
Fig. 4
Fig. 2
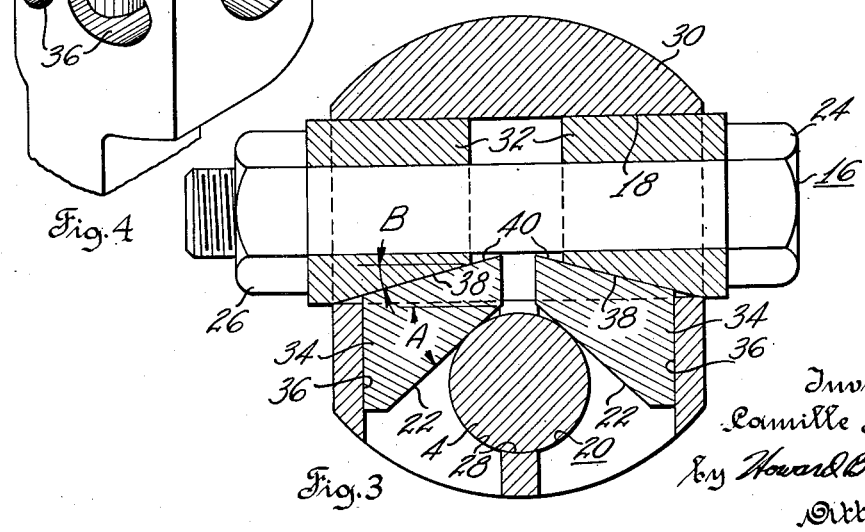
Fig. 3
Inventor
Camille Speisman
By Howard B. Scheckman
Attorney

United States Patent Office 2,834,085
Patented May 13, 1958

2,834,085

TWO BLOCK SYSTEM CLAMPING DEVICE

Camille Speisman, Milwaukee, Wis., assignor to Allis-Chalmers Manufacturing Company, Milwaukee, Wis.

Application January 18, 1957, Serial No. 634,974

8 Claims. (Cl. 24—263)

This invention relates to a clamp. The clamp is used in the steam inlet valve of a steam turbine. The clamp joins the valve shaft of the valve to a drive mechanism that reciprocates the valve shaft.

The trend today in steam turbine design, because of advances in technology, is toward high steam pressures. As steam pressure increases, it requires greater force to lift the valve steam from its seat so steam can be admitted to the turbine.

The prior art clamps that join the valve shaft to the drive mechanism are inadequate for turbines greater than 75,000 kw. These clamps contain a pair of movable wedges that cannot grip the valve shaft with enough force to lift the valve shaft against the steam pressure.

This is not just a problem of substituting a stronger clamp for a weaker one. Unless the new clamp is of substantially the same size and shape of the prior art clamp, it will be extremely costly to modify the structure of the inlet valve and the valve shaft.

The new clamp comprises a device wherein wedge shaped blocks are moved to cam jaws in a direction normal to the direction the wedge shaped jaws are moved. The jaws in turn engage the valve shaft and jam it against a portion of the clamp.

It is an object of my invention to provide a new and improved clamp that can provide the necessary gripping force needed to lift the valve shaft against the increased steam pressures encountered in present turbines.

It is another object of this invention to provide a new and improved clamp of substantially the same size and shape as prior art clamps, so that the substitution of my new clamp for the prior art clamps will not require modification of surrounding structure of the inlet valve or the valve shaft in past or in future installations.

Other advantages and objects will appear from the following description considered in conjunction with the attached drawings, in which:

Fig. 1 is a sectional view of an inlet valve of a steam turbine showing a prior art clamp joining the valve shaft and the drive mechanism;

Fig. 2 is a sectional view of Fig. 1 taken in the direction of arrows II—II of the prior art clamp;

Fig. 3 is a view similar to Fig. 2 disclosing a cross section of the new and improved clamp; and Fig. 4 is a perspective view of the housing of said new clamp.

Referring to Fig. 1, the relative position of a prior art clamp in the inlet valve is illustrated. The inlet valve comprises a valve body 2 containing a movable valve shaft 4 having a valve stem 5 that moves from and toward valve seat 6 to control the flow of steam to an exit 7 leading to the turbine. Valve shaft 4 is connected by clamp 8 to drive mechanism 10 that reciprocates valve shaft 4.

A cross section of the prior art clamp 8 is shown in Fig. 2. The prior art clamp comprises: a housing 12 containing two movable cylindrical gripping blocks 14 movable within said housing, and a force means 16 to move said gripping blocks. Housing 12 contains a cylindrical passage 18 that supports the two movable cylindrical gripping blocks 14, and an entrance passage 20 that receives the valve shaft or workpiece 4 to be gripped. Each gripping block 14 has an inclined or cam surface 22. Inclined surfaces 22 of the gripping blocks cooperate to form the sides of a V for engagement with the surface of valve shaft 4 to be clamped.

Force means 16 that moves gripping blocks 14 comprises: a bolt 24 inserted through gripping blocks 14 and a nut 26 threadable on said bolt. Tightening of nut 26 moves the gripping blocks toward each other.

The prior art clamp operates in the following manner. The workpiece or valve shaft 4 is inserted into entrance passage 20 and nut 26 is tightened. This causes inclined surfaces 22 to move against valve shaft 4, forcing the valve shaft against portions of the interior surface 28 of passage 20. Inclined surfaces 22, and surfaces 28, clamp the valve shaft at spaced points.

As is common, each inclined surface 22 is at an angle A of approximately 45° to center the valve shaft or workpiece. An angle of 45° provides the best compromise between attempting to space the forces equally around the valve shaft and still provide a large vertical component of the force that inclined surfaces 22 apply to the valve shaft. That is, for best spacing angle A should be 60° so that the forces applied to the valve shaft will be 120° apart. But as angle A approaches 60°, the vertical component of the force that jams the valve shaft against surface 28 decreases. A 45° angle is a compromise between these two conditions.

Referring to Fig. 3 my new and improved clamp will be described. Similar elements will be referred to by the same numeral.

The new clamp comprises: a housing 30, two movable cylindrical wedge shaped blocks 32, two cylindrical jaws 34 moved by said wedge shaped blocks 32, and a force means 16 to move said blocks 32 and jaws 34.

Housing 30 contains four cylindrical passages: a cylindrical passage 18 that supports the two movable wedge shaped blocks 32, an entrance passage 20 at right angles to passage 18 to receive the valve shaft or workpiece 4, and two lateral passages 36 (Figs. 3 and 4) at right angles to passages 18 and 20. Lateral passages 36 guide jaws 34. Both lateral passages 36 pass through entrance passage 20 so that valve shaft 4 overlaps both lateral passages. Lateral passages 36 also intercept passage 18 so jaws 34 can contact wedge shaped blocks 32.

Cylindrical wedge shaped blocks 32 which move jaws 34 are slidably carried in passage 18. Each cylindrical wedge shaped block has an inclined or cam surface 38 at an angle B to its axis. When wedge shaped blocks 32 are moved, jaws 34 slide on inclined surface 38 and are cammed into engagement with the valve shaft.

Each jaw 34 has a smooth surface 40 at one end in engagement with surface 38 of wedge shaped block 32, and an inclined or cam surface 22 at the other end that engages the valve shaft. Inclined surfaces 22 on the jaws cooperate to form the sides of a V for engagement with the surface of valve shaft 4 to be clamped. Inclined surface 22 is at an angle A of 45° to valve shaft 4. This is similar to surfaces 22 of gripping block 14 (Fig. 2).

Any force means 16 can be employed to move wedge shaped blocks 32 toward each other to cam jaws 34 into engagement with valve shaft 4. In the embodiment disclosed, the force means comprises: a bolt 24 inserted through wedge shaped blocks 32 and a nut 26 threaded on said bolt.

The clamp operates in the following manner. Valve shaft 4 is inserted into passage 20. Tightening nut 26 moves wedge shaped blocks 32 toward each other. As wedge shaped blocks 32 are moved toward each other, inclined cam surfaces 38 slide relative to surfaces 40. This moves jaws 34 normal to the direction of movement of wedge shaped blocks 32. Surfaces 22 that form a V are moved against the valve shaft, forcing the valve shaft against portions of the interior surface 28 of housing 30.

The force with which the new clamp can grip depends on two things: (1) the friction between the moving parts, and (2) the angle B. As friction between the moving parts increases (not including the friction between surfaces 22 and workpiece 4 where high friction is desired) the force with which the clamp grips valve shaft 4 will decrease more rapidly than in the prior art clamp. This is because there are more moving parts in the new clamp and therefore more friction to overcome. Also, as angle B increases the clamping force decreases. This is because the vertical component of the force exerted by force means 16, that acts through wedge shaped blocks 32 against jaws 34, decreases as angle B increases.

For example: assuming the coefficient of friction between the moving parts is .1; if angle B is 10°, the new clamp will grip with a force 2.7 times greater than the old clamp, while at an angle of 50° it will be 0.2 times greater.

Assuming the coefficient of friction has increased to .2; if angle B is 10° the new clamp will grip with a force 1.8 times greater than the old clamp; while at an angle of 30° the gripping force will be equal to the prior art clamp and there would be no longer an advantage in using this clamp.

The specific angle B at which the clamp becomes self-locking depends on the coefficient of friction between wedge shaped blocks 32 and jaws 34. However, if angle B is made greater than 12°, the wedge shaped blocks and jaws will not become self-locking under normally encountered coefficients of friction.

Therefore, for best results, an angle B should be selected between 12°–40°, and the surfaces between the moving parts should be made smooth or lubricated to reduce the coefficient of friction to a value less than .2 if a large angle B is used.

In a comparison test of both clamps, the following steps were followed and results obtained. To reduce friction, all the parts (with the exception of workpiece 4 and inclined surfaces 22 where high friction is desired) were coated with the lubricant "Moly-cote" ($MoS_2$). The workpiece was gripped using a bolt 24, 1″ in diameter. Angle B was made 15°. The workpiece was chrome plated to duplicate actual inlet valve shafts. A two hundred seventy-five foot-pound torque was applied on nut 26 by means of a torque wrench. The complete assembly was placed in a tensile testing machine and an axial force applied slowly and continually. Slippage was shown by interruption of the buildup of oil pressure in the tensile testing machine. Identical conditions were applied on both clamps. The same shaft and the same type bolt and nut were used on the two designs. The coefficient of friction was calculated to be approximately 1.5 between all moving parts, and .2 between the workpiece and surfaces 22.

Th prior art clamp was determined to have a holding capacity of 15,850 pounds. The new clamp was determined to have a holding capacity of 25,300 pounds. The new clamp has the ability to grip with a force 1.6 times greater than the old clamp. This is not a great difference, however it is a substantial improvement and permits the clamp's use in present day high pressure turbines where prior art clamps cannot be used.

In summary, the new clamp comprises a system wherein wedge shaped blocks are moved to cam jaws in a direction normal to the direction the wedge shaped jaws are moved. The jaws in turn engage the valve shaft and jam it against the inner surface 28 of housing 30 to lock the valve shaft between the two jaws 34 and the inner surface 28 of the housing.

The advantages of this clamp are that a greater holding force can be applied to the workpiece. This clamp can be employed in substantially the same space and volume as was used by the prior art clamps. This allows the new clamp to be used without the need of changing the surrounding structure of the inlet valve, or the valve shaft.

From the foregoing it will be apparent to those skilled in the art that the illustrated embodiment of the invention provides a new and improved clamp. It will be apparent that although passages 18, 20 and 36, wedge shaped blocks 32 and jaws 34 are described as cylindrical, that the passages, the wedge shaped blocks and the jaws can be made in various shapes such as, for example, square and triangular. It will be apparent to one skilled in the art that other changes and modifications may be made therein without departing from the spirit of the invention or from the scope of the appended claims.

What is claimed is:

1. A clamp for a workpiece comprising: a housing, first and second wedge shaped blocks movably supported within said housing, force means connected to said wedge shaped blocks to move said wedge shaped blocks, a first movable jaw in engagement with said first wedge shaped block, and a second movable jaw in engagement with said second wedge shaped block, said first and said second jaws being moved by said first and said second wedge shaped blocks respectively, portions of the interior of said housing abutting portions of said first and said second jaws to guide said first and said second jaws so they move toward said workpiece, a portion of the interior surface of said housing abutting said workpiece, and a portion of the surface of said first jaw and of said second jaw cooperating to define the sides of a V for engagement with the surface of the workpiece to be clamped, said first and said second wedge shaped blocks when they are moved by said force means, moving said first and said second jaws and in turn their surfaces that define said V against said workpiece, forcing said workpiece against said portion of the interior surface of said housing abutting said workpiece to clamp said workpiece.

2. A clamp for a workpiece comprising: a housing, a first wedge shaped block having a wedge angle of 12° to 40°, a second wedge shaped block having a wedge angle of 12° to 40°, said first and said second wedge shaped blocks being movably supported within said housing, force means connected to said wedge shaped blocks to move said wedge shaped blocks, a first movable jaw having a complementary surface in engagement with said first wedge shaped block, and a second movable jaw having a complementary surface in engagement with said second wedge shaped block, said first and said second jaws being moved by said first and said second wedge shaped blocks respectively, portions of the interior of said housing abutting portions of said first and said second jaws to guide said first and said second jaws so they move toward said workpiece, a portion of the interior surface of said housing abutting said workpiece, and a portion of the surface of said first jaw and of said second jaw cooperating to define the sides of a V for engagement with the surface of the workpiece to be clamped, said first and said second wedge shaped blocks when they are moved by said force means, moving said first and said second jaws and in turn their surfaces that define said V against said workpiece, forcing said workpiece against said portion of the interior surface of said housing abutting said workpiece to clamp said workpiece.

3. A clamp for a workpiece comprising: a housing, first and second wedge shaped blocks movably supported within said housing, force means connected to said wedge shaped blocks to move said wedge shaped blocks, a first movable jaw in engagement with said first wedge shaped block, and a second movable jaw in engagement with said second wedge shaped block, said first and said second jaws being moved by said first and said second wedge shaped blocks respectively, portions of the interior of said housing abutting portions of said first and said second jaws to guide said first and said second jaws so they move parallel to each other and normal to the direction of movement of said first and said second wedge shaped blocks, a portion of the interior surface of said housing abutting said workpiece, and a portion of the surface of said first jaw and of said second jaw cooperating to define the sides of a V for engagement with the surface of the workpiece to be clamped, said first and said second wedge shaped blocks when they are moved by said force means, moving said first and said second jaws and in turn their surfaces that define said V against said workpiece, forcing said workpiece against said portion of the interior surface of said housing abutting said workpiece to clamp said workpiece.

4. A clamp for a workpiece comprising: a housing, a first wedge shaped block having a wedge angle of 12° to 40°, a second wedge shaped block having a wedge angle of 12° to 40°, said first and said second wedge shaped blocks being movably supported within said housing, force means connected to said wedge shaped blocks to move said wedge shaped blocks, a first movable jaw having a complementary surface in engagement with said first wedge shaped block, and a second movable jaw having a complementary surface in engagement with said second wedge shaped block, said first and said second jaws being moved by said first and said second wedge shaped blocks respectively, portions of the interior of said housing abutting portions of said first and said second jaws to guide said first and said second jaws so they move parallel to each other and normal to the direction of movement of said first and said second wedge shaped blocks, a portion of the interior surface of said housing abutting said workpiece, and a portion of the surface of said first jaw and of said second jaw cooperating to define the sides of a V for engagement with the surface of the workpiece to be clamped, said first and said second wedge shaped blocks when they are moved by said force means, moving said first and said second jaws and in turn their surfaces that define said V against said workpiece, forcing said workpiece against said portion of the interior surface of said housing abutting said workpiece to clamp said workpiece.

5. A clamp for a workpiece comprising: a housing, said housing having a first passage and two passages lateral to and intercepting said first passage, first and second wedge shaped blocks movably supported within said first passage in said housing, force means connected to said wedge shaped blocks to move said wedge shaped blocks past said lateral passages, a first movable jaw movably guided in one of said lateral passages and in sliding engagement with said first wedge shaped block, and a second movable jaw movably guided in the other of said lateral passages and in sliding engagement with said second wedge shaped block, said housing being provided with an opening defining an entrance passage for said workpiece, said entrance passage intercepting said two lateral passages so said workpiece overlaps both lateral passages, and a portion of the surface of said first jaw and of said second jaw cooperating to define the sides of a V for engagement with the surface of the workpiece to be clamped, said first and second wedge shaped blocks when they are moved by said force means, moving said first and second jaws and in turn their surfaces that define said V against said workpiece, forcing said workpiece against a portion of the interior surface of said entrance passage to clamp said workpiece.

6. A clamp for a workpiece comprising: a housing, said housing having a first passage and two passages lateral to and intercepting said first passage, a first wedge shaped block having a wedge angle of 12° to 40°, a second wedge shaped block having a wedge angle of 12° to 40°, said first and second blocks being movably supported within said first passage in said housing, force means connected to said wedge shaped blocks to move said wedge shaped blocks, a first movable jaw movably guided in one of said lateral passages and in sliding engagement with said first wedge shaped block, and a second movable jaw movably guided in the other of said lateral passages and in sliding engagement with said second wedge shaped block, said housing being provided with an opening defining an entrance passage for said workpiece, said entrance passage intercepting said two lateral passages so said workpiece overlaps both lateral passages, and a portion of the surface of said first jaw and of said second jaw cooperating to define the sides of a V for engagement with the surface of the workpiece to be clamped, said first and second wedge shaped blocks when they are moved by said force means, moving said first and second jaws and in turn their surfaces that define said V against said workpiece, forcing said workpiece against a portion of the interior surface of said entrance passage to clamp said workpiece.

7. A clamp for a workpiece comprising: a housing, said housing having a first passage and two parallel passages normal to and intercepting said first passage, first and second wedge shaped blocks movably supported within said first passage in said housing, force means connected to said wedge shaped blocks to move said wedge shaped blocks, a first movable jaw movably guided in one of said parallel passages and in sliding engagement with said first wedge shaped block, and a second movable jaw movably guided in the other of said parallel passages and in sliding engagement with said second wedge shaped block, said housing being provided with an opening defining an entrance passage for said workpiece, said entrance passage intercepting said two parallel passages so said workpiece overlaps both parallel passages, and a portion of the surface of said first jaw and of said second jaw cooperating to define the sides of a V for engagement with the surface of the workpiece to be clamped, said first and second wedge shaped blocks when they are moved by said force means, moving said first and second jaws and in turn their surfaces that define said V against said workpiece, forcing said workpiece against a portion of the interior surface of said entrance passage to clamp said workpiece.

8. A clamp for a workpiece comprising: a housing, said housing having a first passage and two parallel passages normal to and intercepting said first passage, a first wedge shaped block having a wedge angle of 12° to 40°, a second wedge shaped block having a wedge angle of 12° to 40°, said first and said second wedge shaped blocks being movably supported within said first passage in said housing, force means connected to said wedge shaped blocks to move said wedge shaped blocks past said parallel passages, a first movable jaw movably guided in one of said parallel passages and having a complementary surface in sliding engagement with said first wedge shaped block, and a second movable jaw movably guided in the other of said parallel passages and having a complementary surface in sliding engagement with said second wedge shaped block, said housing being provided with an opening defining an entrance passage for said workpiece, said entrance passage intercepting said two parallel passages so said workpiece overlaps both parallel passages, and a portion of the surface of said first jaw and of said second jaw cooperating to define the sides of a V for engagement with the surface of the workpiece to be clamped, said first and said second wedge shaped blocks when they are moved by said force means, moving said first and second jaws and in turn their surfaces that define said V against said workpiece, forcing said workpiece against a portion of the interior surface of said entrance passage to clamp said workpiece.

References Cited in the file of this patent

UNITED STATES PATENTS

| | | |
|---|---|---|
| 699,911 | Davis | May 13, 1902 |
| 1,326,601 | Ledwinka | Dec. 30, 1919 |
| 2,674,772 | Jacobs | Apr. 13, 1954 |